March 16, 1937.　　　　F. W. HOORN　　　　2,073,637
MOTION PICTURE SYSTEM UTILIZING CONTINUOUSLY MOVING FILM
Filed Dec. 7, 1934　　　4 Sheets-Sheet 1
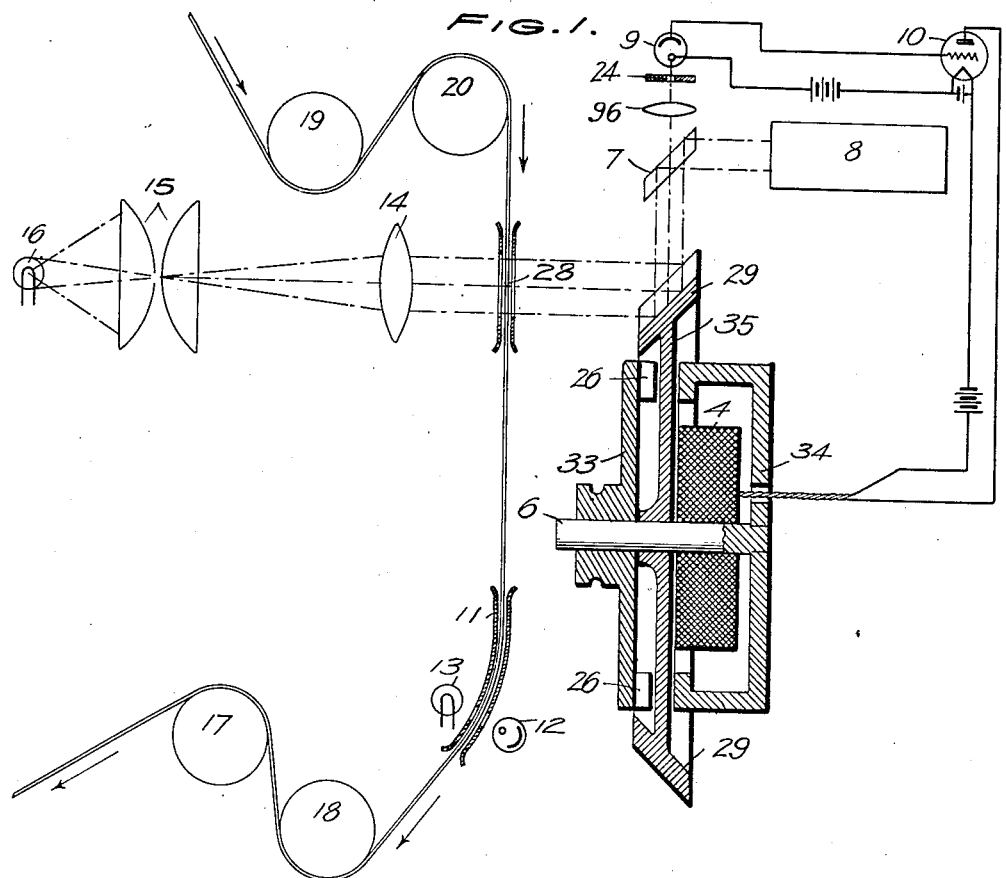
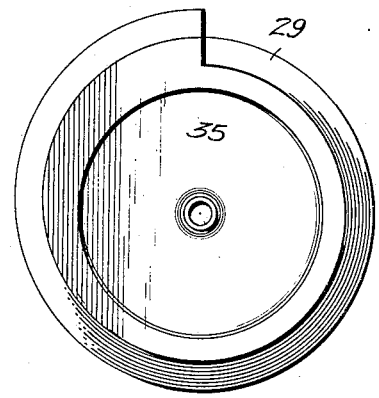
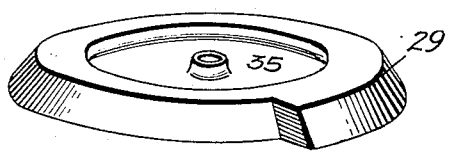
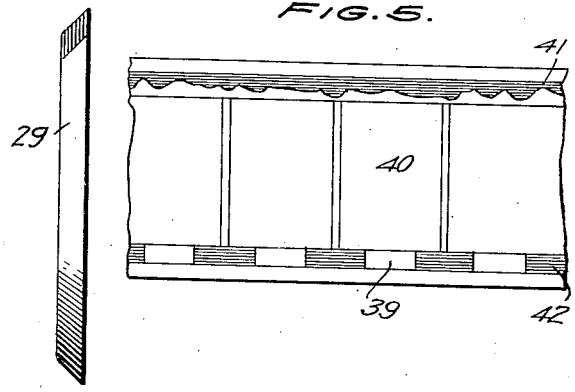
INVENTOR
FREDERICK W. HOORN
ATTORNEYS March 16, 1937.  F. W. HOORN  2,073,637
MOTION PICTURE SYSTEM UTILIZING CONTINUOUSLY MOVING FILM
Filed Dec. 7, 1934  4 Sheets-Sheet 2
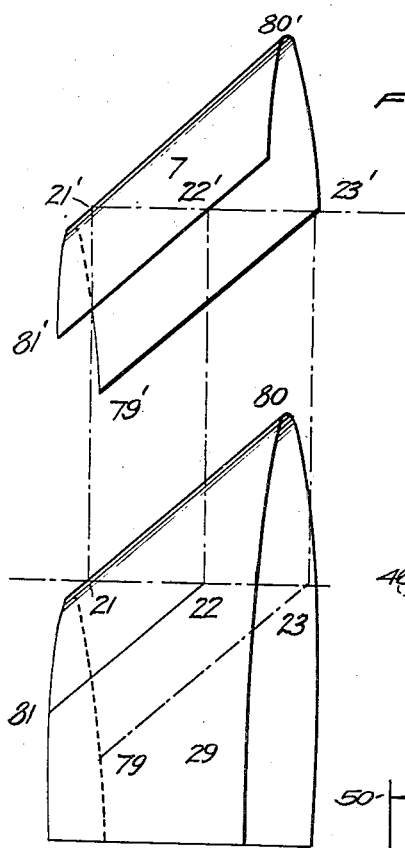
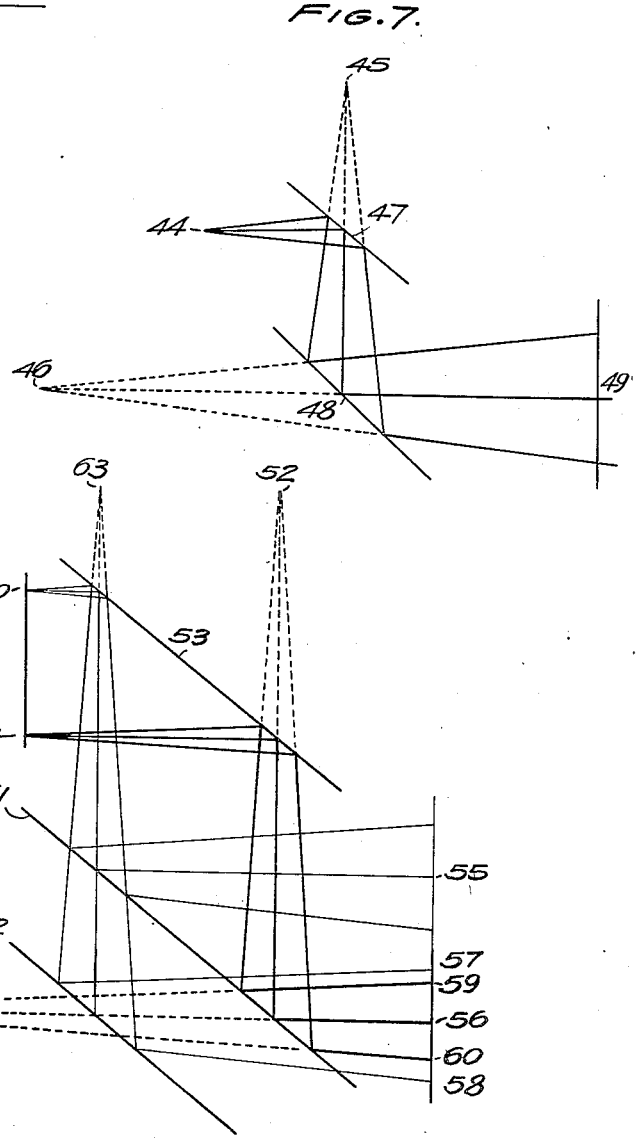
INVENTOR
FREDERICK W. HOORN
BY Francis H. Vanderwerken
Charles A. Dowe
ATTORNEYS March 16, 1937.  F. W. HOORN  2,073,637
MOTION PICTURE SYSTEM UTILIZING CONTINUOUSLY MOVING FILM
Filed Dec. 7, 1934  4 Sheets-Sheet 3

INVENTOR
FREDERICK W. HOORN
BY Francis F. Vanderwerken
Charles A. Rowe
ATTORNEYS

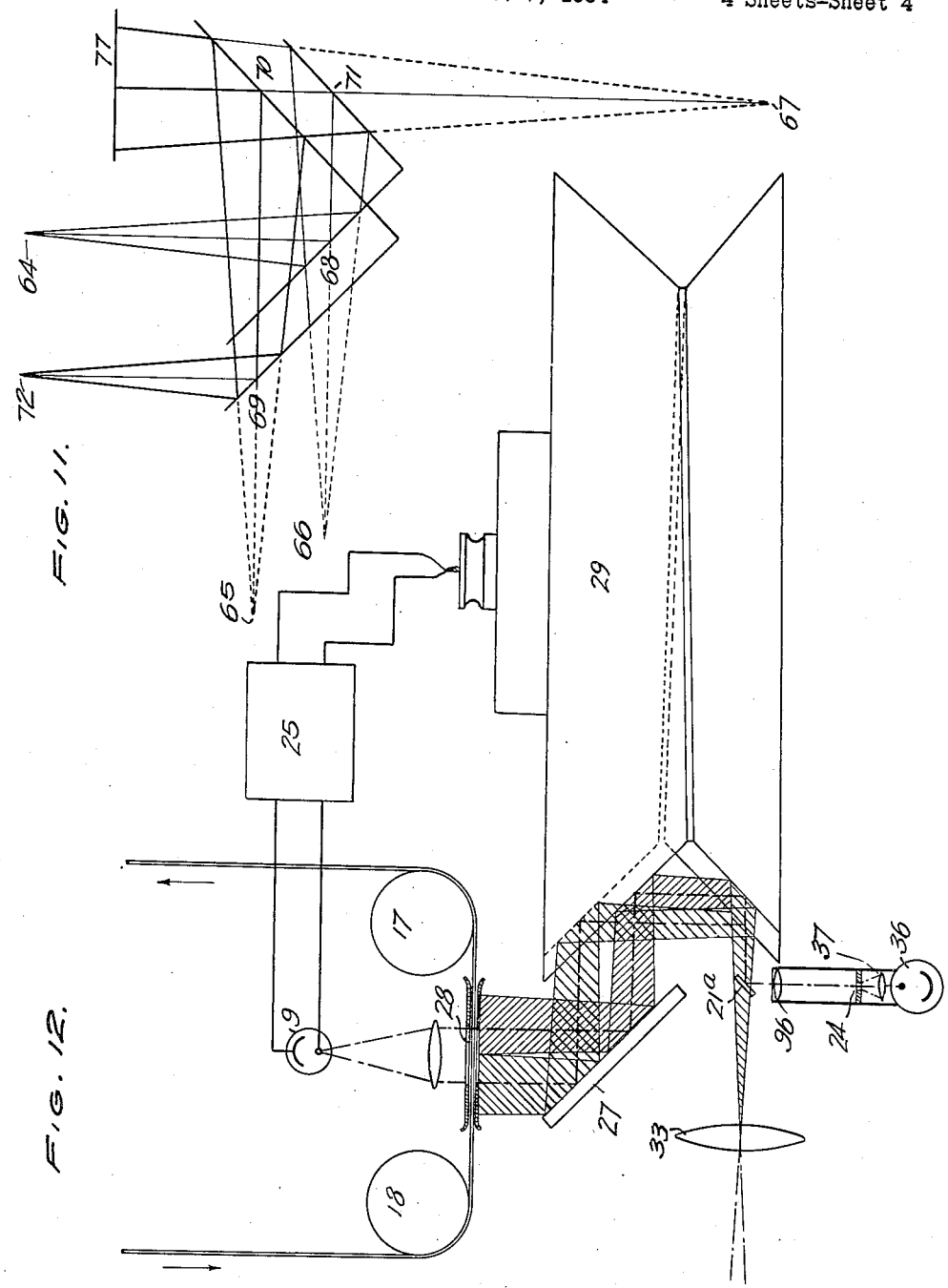

Patented Mar. 16, 1937

2,073,637

UNITED STATES PATENT OFFICE 2,073,637

MOTION PICTURE SYSTEM UTILIZING CONTINUOUSLY MOVING FILM

Frederick W. Hoorn, Washington, D. C.

Application December 7, 1934, Serial No. 756,432

3 Claims. (Cl. 88—16.8)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to motion picture systems and proposes methods and means of effecting the transfer of an image to or from a continuously moving film in such a manner that, although the film image moves continuously with the film, its counterpart in actual scene or the corresponding screen image may remain stationary.

While motion picture projectors and cameras in common use require an intermittent motion of the film, holding it fixed in place while the image is recorded or projected, the advantages of equipment in which the film moves continuously have long been recognized. Some of the advantages are silence of operation, longer life of the film and greater simplicity of operation. It is well known that continuous projectors have been devised. However no simple and effective system has heretofore been proposed.

An object of the present invention is to provide a method and means whereby an image on a continuously moving film in a motion picture projector, may be projected on a distant screen in such a manner that it remains substantially fixed on the screen for a period sufficient to provide adequate illumination.

A further object of the invention is to provide a method and means whereby an image of a physical scene may be recorded in a motion picture camera on a continuously moving film, in such a manner that the image travels with, and remains fixed with reference to the film, throughout a period sufficient to provide adequate exposure of the film.

The structural organization and mode of operation will now be described in detail in connection with the accompanying drawings in which:

Fig. 1 shows schematically the arrangement of the various elements in a sound film projector, including the electrical circuits and the means whereby the position of the image on the screen is controlled;

Fig. 2 is a plan of the disc which accomplishes the relative translation of the screen image with reference to the film image in the apparatus of Fig. 1;

Fig. 3 is a view showing how the reflecting surface of the disc is developed from the frustum of a cone;

Fig. 4 is a perspective view of the reflecting disc of Fig. 1;

Fig. 5 represents the arrangement on the film of the picture image, the sound track and the synchronizing or movement control track;

Fig. 6 shows diagrammatically a portion of the surface of disc 29 in Fig. 1, its geometrical relationship to the mirror of Fig. 1, and the effect on a plane of light intercepted by said surfaces;

Fig. 7 is a diagram showing the effect of reflecting diverging pencils of light from a plane stationary surface;

Fig. 8 is a diagram illustrating the displacement of a light beam corresponding to film movement and to the reverse displacement caused by displacement of the reflecting surface;

Fig. 11 is a diagram showing the effect of the double reflection in the projector of Fig. 9, on the diverging pencils of light, of which the light beam is actually composed;

Fig. 12 represents an adaptation of the principles of this invention to a non-intermittent motion picture camera.

Figure 9:
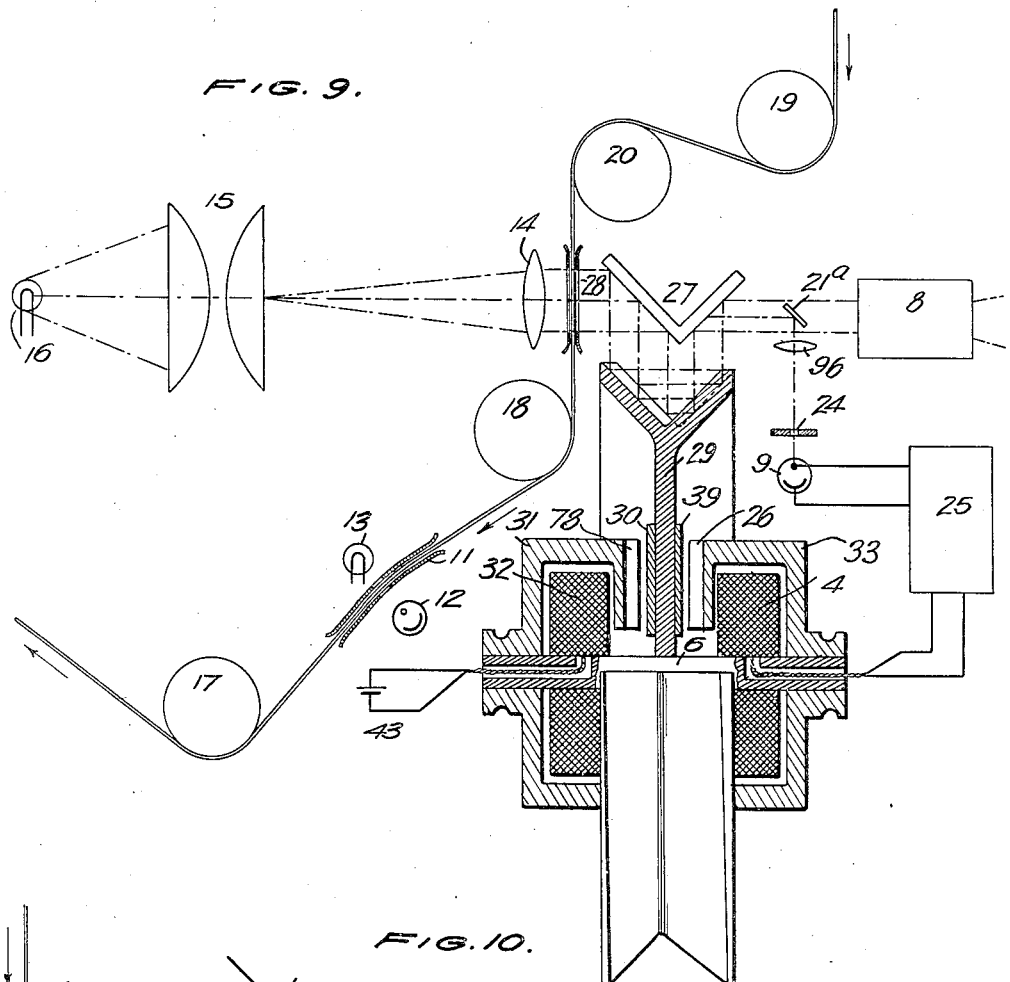
Fig. 9 represents another embodiment of the invention as applied to a sound motion picture projector, in which by double reflection from the rotating reflecting disc, the required displacement of the screen image with reference to the film image is effected without changing the length of the beam of light.

For simplicity the sound reproducing system is represented in the several drawings by a light source and a light sensitive cell. The main drive, being the conventional type of motor, is omitted.

Referring now to Fig. 1, light source 16, together with condensing lens 15 and auxiliary lens 14, provides a light beam, which for the purpose of this development may, for the time being, be considered as being composed of parallel rays. Actually the rays composing the beam will be parallel only if a point source is available. This beam passes through the film at picture aperture 20 and strikes the reflecting surface of rotating disc 29, from which it is reflected to stationary mirror 7, thence to projection lens 8, through which it is projected to the screen.

The rotating disc 29 is constructed as shown in Fig. 2. Its reflecting surface is that which would be developed from the frustum of a cone by progressively reducing its radius as it rotates. If, therefore, a fixed vertical plane is passed through the axis of rotation, its intersection with the surface will be a line which will be displaced in a vertical direction as the disc rotates. Similarly if a light beam impinges on the reflecting surface the area from which it is reflected will be translated or displaced in a vertical direction as the disc rotates. Its displacement will be up or down, depending on the direction of rotation of the disc. If the disc is rotated through one revolution while the film is advanced one frame, and if the disc is so constructed that one revolution of the disc, displaces the reflecting surface vertically by an amount equal to the height of one frame of the picture on the film, and if the direction of rotation of the disc is correct, the image on projection lens 8 of Fig. 1, will remain stationary. The screen image will, therefore, likewise remain stationary.

In Fig. 6 is shown the relationship between disc 29 and mirror 7 of Fig. 1. Each element of mirror 7 is parallel to and at the same distance from the corresponding element of disc 29, as any other element of mirror 7 is from its corresponding element in disc 29. Otherwise stated, the inner surface of mirror 7 is of exactly the same form as the corresponding area of the reflecting surface of disc 29. A plane section of a light beam striking disc 29 is, therefore, reflected as a plane from mirror 7 and the light beam remains undistorted after the reflection. The line in such a plane striking disc 29 at 21, is reflected to 21' on mirror 7, while the line in the same plane striking disc 29 at 22, is reflected to 22' on mirror 7. Since 22', 81' is the same distance from 22, 81 as 21', 80' is from 21, 80 and since these elements are parallel, it can be seen as shown in Fig. 6, that points 21' and 22' lie in the same plane of light reflected from mirror 7. Similar reasoning applied to each element in a plane and to each plane of incident light, will show that a rectangular beam of light striking the reflecting surface of disc 29, will be reflected undistorted from mirror 7. Referring again to Fig. 1, it will be seen that during the vertical translation of the reflecting surface of disc 29, the distance traversed by the light beam is changed. Since the back focus of the projection lens 8 remains unchanged the screen image will be thrown out of focus by an amount which is dependent on the degree to which the beam departs from parallelism. A preferred form of the invention set forth later will show a method of overcoming this difficulty.

Referring now to Fig. 5, a form of the film which it is proposed to utilize, is shown. It contains the usual succession of picture frames 40 and the usual form of sound track 41. In addition a form of track is provided as shown at 42, for controlling the movement of the device for shifting or translating the image. By synchronizing the movement of the image shifting device with that of the film, this track in conjunction with other means later discussed keeps the screen image stationary. The light transmitting areas may be transparent film or may consist of perforations in the film.

Referring again to Fig. 1, it should be understood that the light rays in the control beam passing through the synchronizing track are laterally offset form the picture beam. In addition to the lateral offset of this track on the film, additional lateral displacement may be provided by means of a small mirror adjacent to the picture aperture, in the path of the control beam and at such an angle to it as to effect a lateral displacement of the beam, and another mirror which restores the direction of the control beam to parallelism with the median line of the picture beam. This lateral offset of the control beam permits it to pass by mirror 7, through lens 96 and slit 24 and into light sensitive element 9. It is made necessary to prevent overlapping of the picture beam and the control beam due to the fact that cones or pencils of light pass through each element of the film. The mirrors which accomplish this offset are omitted for the sake of simplicity, in view of the fact that the essence of the invention is not dependent upon this detail.

Whenever a transparent or low density area in the synchronizing track of the film is in such a position in the picture gate, that the light transmitted through it is reflected through slit 24 and into light sensitive element 9, said element 9 is energized, and acting through an amplifying device 10, it supplies current to field coil 4 of the mechanism which drives disc 29. A magnetic field is, therefore, set up through the magnetic circuit consisting of stationary frame 34, shaft 6, and rotating wheel 33, all of which are constructed of magnetic material. Wheel 33 is provided with alternate slots and teeth 26 around the inner surface of its periphery and is driven by mechanical or other means at a speed in excess of the mean speed desired for reflecting disc 29. As wheel 33 rotates, the magnetic flux passing through the web 35 of disc 29 is varied by the passage of the slots and teeth 26. Web 35 of disc 29 is of conducting material and variations in flux passing through it, set up eddy currents, which react with the flux to produce a torque and consequent rotation of disc 29. This driving torque continues to be exerted until an area of greater density in the movement control track is interposed at such a position in the light beam as to cut off or decrease the light falling on light sensitive element 9, and thereby deenergize field coil 4. Disc 29 is then decelerated until a light transmitting area in the movement control track permits light sensitive element 9 to be energized again. A ray of light transmitted through the movement control track is reflected from the surface of disc 29 and is, therefore, displaced in the same manner as a ray of light in the beam carrying the picture image. Therefore, as long as the disc 29 rotates in synchronism with the film movement, or one revolution while the film advances one frame, the light transmitted to light sensitive element 9 will not change. This condition will obtain when only a portion of slit 24 is illuminated. If the full width of the slit is illuminated the disc 29 will be accelerated above mean synchronous speed. If the full width of the slit is dark the disc 29 will be decelerated below the desired mean speed. These variations may be kept very slight and need not be large enough to cause objectionable lack of registration or picture jump. Only one drum 17 is driven at fixed speed. The other drums, 18, 19 and 20 are idlers. The film moves uniformly past picture gate 28 and sound gate 11. Exciter lamp 13 and photoelectric cell 12 represent the normal sound reproducing system.

Referring now to Fig. 7, it will be seen that a divergent pencil of light may be reflected from a plane stationary mirror without distortion or altering the relative length of path of the various rays. A pencil of light emanating from source 44 is reflected from mirror 47 causing a virtual image at 45. It is again reflected from 48 producing a virtual image 46. The distance 44, 47 equals the distance 45, 47 and the distance 46, 48 equals the distance 45, 48. The light incident on 49 falls on it in the same direction as if it emanated from source image 46. No distortion has resulted.

Referring now to Fig. 8, 51 is a source from which emanates a divergent pencil of light. The light is reflected from plane, stationary mirror 53, producing virtual image 52, and is again reflected from reflecting surface 61, terminating at points 59, 56 and 60. Now considering 51 to be an element in the picture image on a film through which passes a divergent pencil of light, when the film moves, carrying this element to a new position 50, a displacement or translation of the light beam carrying that element of the picture image is effected so that the pencil of light now terminates at 55. A counter or compensating movement of the pencil of light carrying this element of the image can now be effected by displacing reflecting surfaces 61 to 62, with the result that the pencil of light has been moved back to its original position. However, owing to the fact that the length of the rays has been increased, the size of the bundle of rays at the terminal plane has been increased, the outer rays terminating at 57 and 58 instead of 59 and 60, as before.

Figure 10:
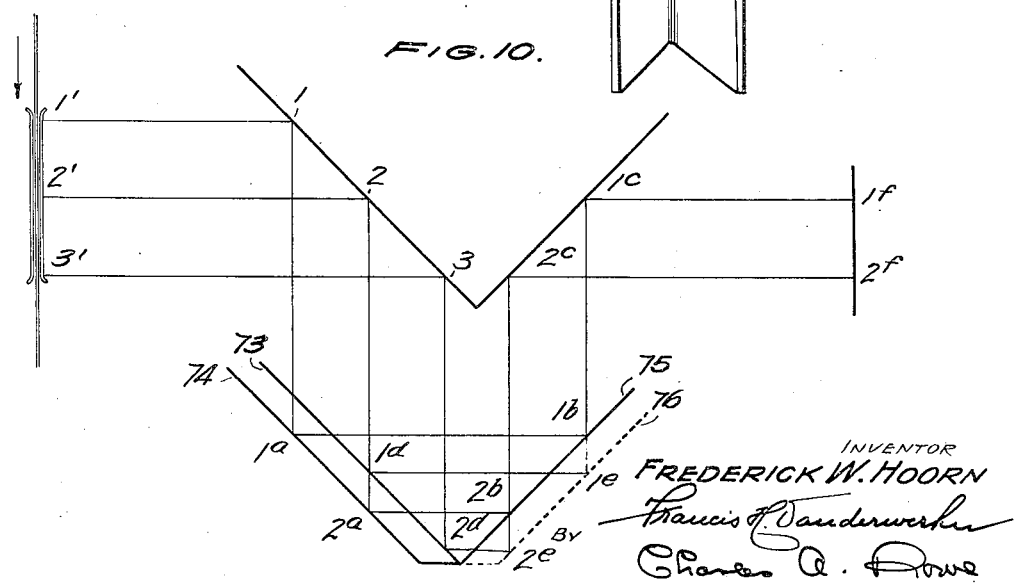
Fig. 10 is a diagram showing the path of the parallel elements in the light beam in the projector of Fig. 9.

Referring now to Fig. 10, a method is indicated diagrammatically whereby a reverse movement of a light beam may be effected without changing the length of path of the beam. The path of a light ray through the bottom of a frame of the picture is represented by $1'—1—1a—1b—1c—1f$. The path of a light ray through the top of the frame at the same moment is $2'—2—2a—2b—2c—2f$. As the film travels downward, reflecting surfaces 74 and 75 are displaced to positions 73 and 76, respectively. Ray $1'—1$ arrives in the position $2'—2$ and now follows the path $2'—2—1d—1e—1c—1f$, thus terminating at the same point as it did before the movement of the film throughout one frame had occured. Likewise the ray through the point on the film which was originally at $2'$, now traverses the path $3'—3—2d—2e—2c—2f$, and terminates at the same point where it did before the movement of the film occurred. It will further be seen that, if the translation of the reflecting surface is proportional to the movement of the film throughout the cycle, this ray as well as all others will terminate at a fixed point during the movement of the film through a distance equal to the height of a frame. Further, it can readily be seen that the distance traversed by a ray throughout the movement, remains constant. While this fact remains true for other angles, it can more readily be proven using angles of incidence and reflection equal to 45 degrees. Let the amount of vertical displacement of the reflecting surfaces 74 and 75 equal one half the height of a frame. Then as the film moves downward one frame, the distance $2—1d$ is seen to be one half a frame shorter than the distance $1—1a$. However, on its upward path the distance $1e—1c$ is seen to be one half frame longer than the distance $1b—1c$. The total distance is, therefore, unchanged as the horizontal distances are not affected.

Referring now to Fig. 11 it will be seen that the method of double reflection from two moving surfaces may be applied to a beam consisting of divergent pencils of light as well as to one consisting of parallel rays. Light transmitted through the film at 72 is reflected at 69 and again at 70. As the element in the film image moves from 72 to 64 the reflecting surfaces are displaced vertically through a distance equal to half the distance 72—64. The pencil of light is now reflected at 68 and 71, and terminates on the same area and in the same direction as before. Point 67 remains a virtual image of element 72 throughout its movement to point 64. The lengths 65—69—70, 66—68—71—70, and 67—71—70 are all equal. Therefore, if a lens be placed at 77 the film may remain in focus throughout its movement.

Referring now to Fig. 9, there is shown a physical application of the method of double reflection from translating reflecting surfaces. The film is driven by drum 17 and passes over idlers 18, 19 and 20, any of which may be connected to a flywheel. The film passes through picture aperture 28 and sound aperture 11, at which point the sound take off is effected by means of an exciter lamp and photoelectric cell. Light source 16 and condenser lens 15 have the same functions these elements normally have. An auxiliary lens 14 placed beyond the source image, may be used to decrease the divergence of the light beam and to transform the light beam into one consisting of a number of pencils of light whose median lines are substantially parallel, as illustrated by the pencils of light in Fig. 11. Mirror 21a is so placed at the side of the beam as to receive the light projected through the synchronizing track and project it downward through lens 96 which focuses the control beam and forms an image of the control track on slit 24, through which the control beam passes into light sensitive element 9. Complete separation of the control beam from the picture beam may be effected by using a pair of small mirrors to offset the control beam the desired amount, one of the mirrors being placed at an angle in the path of the control beam adjacent to the picture gate, the other being placed so as to bring the control or synchronizing beam back into parallelism with the picture beam, and to effect a sufficient offset so that mirror 21a can reflect the synchronizing beam without interferring with the picture beam. These two mirrors are omitted for simplicity.

Light sensitive element 9, when receiving light through the synchronizing track, acts through amplifying device 25 to energize coil 4. This coil sets up a magnetic flux through a circuit consisting of rotating drum 33, shaft 6 and the web of disc 29, which in this form is of magnetic material. Slots and teeth 26 vary the flux through conducting annular ring 30, setting up eddy currents and causing disc 29 to be driven forward in the same direction as mechanically driven drum 33. Therefore, whenever light sensitive element 9 is energized by light from a clear area in the synchronizing track, disc 29 is driven forward. Whenever an opaque area in the synchronizing track cuts off the light from element 9, disc 29 is permitted to decelerate. Disc 29 then tends to rotate in such a relative position that just enough light is reflected into light sensitive element 9 to furnish enough current for coil 4 to keep the disc turning. Some tendency of the disc 29 to oscillate will be encountered. To limit this another drum 31 is provided which is driven mechanically or otherwise, as nearly as possible in synchronism with the film, that is at one revolution per movement of one frame. This drum has alternate teeth and slots 78 which vary the flux passing through conducting annular ring 30. Therefore, whenever disc 29 rotates at a speed other than one revolution per movement of one frame, eddy currents are set up in ring 30, tending to damp out oscillations in the speed of disc 29. Current for coil 32, which sets up the field for this damping device is provided by any convenient source of electromotive force of substantially fixed value. Disc 29, therefore, rotates in substantial synchronism with the movement of the film, displacing the screen image in a direction counter to the displacement caused by the movement of the film. The two displacements being equal and opposite, the screen image remains stationary. Mirror 27 is provided merely to afford a convenient arrangement and does not affect the principles involved. Projection lens 8 serves as a normal projection lens to bring to a focus on the screen the various rays in the pencil of light transmitted through each element of the film image.

Fig. 12 represents another embodiment of the invention as applied to a motion picture camera. Lens 33 is similar to the usual camera lens. The principle of using two rotating, translating, reflecting surfaces is the same as in the other embodiments. Film feed is continuous, the film being passed through aperture 26 and being driven by drum 17. In this arrangement one less plane, stationary mirror and one less change of direction is used. Light source 36 acting through lens system 37, containing slit 24, projects a narrow beam of light through a control track on the film and into light sensitive element 9, which in the same manner as described in the other embodiments, serves to actuate the driving mechanism for reflecting disc 29 and thereby brings about a controlled displacement of the image to compensate for the movement of the film. In view of the fact that unexposed film must be used in a camera, the synchronizing track may be formed by the application of suitable opaque liquids or otherwise marking on it the requisite areas of varying density.

Changes and modifications are contemplated within the spirit and scope of the invention as defined in the appended claims:

I claim:

1. In a motion picture system for projecting a fixed image on a distant surface from an image carried on a continuously moving film; a rotating body provided with a reflecting surface, so formed that a uniform rotation of said body effects a uniform rate of displacement of the light beam carrying the picture image and incident on said surface, said displacement being effected while keeping constant the angles of incidence and reflection of said light beam with said surface; a mechanism for driving said rotating body, comprising a magnetic circuit; a mechanically driven rotating element forming a part of said magnetic circuit, said mechanically driven element being provided with alternate slots and teeth for varying the field strength at points adjacent to the said slots and teeth; a rotary conducting element adjacent to said slots and teeth and cutting the lines of force of said magnetic circuit, and a coil for energizing said magnetic circuit; light sensitive means for energizing said coil in accordance with the light incident on said means; and a track formed on said film, said track being provided with areas for varying the light transmission to said light sensitive means in accordance with the position of the image on said moving film.

2. In a motion picture system employing a continuously moving film, means for effecting a displacement of the rays carrying the picture image, comprising a continuously rotating body provided with complemental helical reflecting surfaces located within the perimeter thereof, said surfaces having equal reflecting areas adapted to operate in opposing phase relation and being so disposed with reference to the path of said rays that a first reflection is effected from one of said surfaces and a subsequent reflection is effected from the other of said surfaces, substantially one half of the displacement of said rays being effected by the linear displacement of the said surface from which the first of said reflections is effected and substantially one half of the displacement of said rays being effected by the linear displacement of the said surface from which the said subsequent reflection is effected.

3. In a motion picture system adapted to utilize a continuously moving film, means for displacing the projected image with reference to the film, comprising a rotating body having reflecting surfaces formed within the peripheral edge thereof, said surfaces being so disposed as to effect a first reflection of the light rays forming said image on one of said surfaces and a subsequent reflection of said rays in opposite phase on the other of said surfaces, each of said surfaces being of a form which would be generated by executing one revolution of a line at a uniform rate about a fixed axis lying in the same radial plane as said line and simultaneously displacing said line in a linear direction parallel to said axis at a uniform rate, said line and said axis being inclined to each other at a fixed angle substantially greater than zero.

4. Motion picture apparatus adapted to utilize continuously moving film comprising a rotating body, each element of said body rotating in a substantially fixed plane, said body having reflecting surfaces formed within the peripheral edge thereof, each of said surfaces being of a form which would be generated by a line moving in such a manner that all points in said line describe equal and oppositely disposed helices about the axis of rotation of said body.

5. In a motion picture system adapted to employ a continuously moving film, means for effecting a displacement of the light rays without changing the length of path of said rays, comprising a rotating body, each element of said body rotating in a substantially fixed plane, said body being formed with two helical reflecting surfaces, said surfaces being fixed in position with reference to said body, and being angularly disposed within the peripheral edge of the body so as to effect a first reflection of said rays from one of said surfaces and a subsequent and opposing reflection of said rays from the other of said surfaces.

6. In a motion picture system adapted to utilize a continuously moving film, and including means for developing the optical equivalent of a picture image; means for displacing the rays carrying said image without changing the length of path of said rays, comprising a body rotating in a substantially fixed plane and provided with helical reflecting surfaces, said surfaces being so disposed as to effect a first reflection from one of said surfaces, and a subsequent reflection from the other of said surfaces, each of said surfaces being of a form which would be generated by executing one revolution of a line about a fixed axis lying in the same radial plane as said line and simultaneously displacing said line in a linear direction parallel to said axis, said line and said axis being inclined to each other at a fixed angle substantially greater than zero; means for continuously rotating said body; an electro-magnetic circuit system; and a magnetic damping mechanism included in said circuit system, said mechanism being operatively coordinated with said body and acting in response to the film movement to control the rotational speed of the body.

7. In a motion picture system adapted to utilize a continuously moving film, and including means to develop the optical equivalent of a picture image; means for displacing the rays carrying said image without changing the length of path of said rays, comprising a body rotating in a substantially fixed plane and provided with helical reflecting surfaces formed in the perimeter thereof, said surfaces being oppositely and angularly disposed in relation to each other so as to effect a first reflection from one of said surfaces, and a subsequent reflection from the other of said surfaces, each of said surfaces being of a form which would be generated by executing one revolution of a line about a fixed axis lying in the same radial plane as said line and simultaneously displacing said line in a linear direction parallel to said axis, said line and said axis being inclined to each other at a fixed angle substantially greater than zero; a mechanically operated driving means for continuously rotating said body; an electrical circuit system; and a magnetic braking mechanism included in said circuit system, said mechanism being operatively coordinated with said body and the moving film for automatically controlling the rotational speed of the body in response to film movement.

8. In a motion picture system employing a continuouly moving film; means for displacing the rays carrying the picture image without changing the length of path of said rays, comprising a rotating body provided with complemental helical reflecting surfaces, each reflecting element of said surfaces being uniformly displaced in a linear path in a direction parallel with the axis of rotation of said body to cause continuous and progressive reflections of said rays; and an electro-magnetic system to effect a continuous rotation of said body, and including means for damping out oscillation in said body by opposing variations from a mean speed of rotation.

FREDERICK W. HOORN.